(12) United States Patent  
Gerts et al.

(10) Patent No.: US 8,378,308 B2
(45) Date of Patent: Feb. 19, 2013

(54) CHARGED PARTICLE DETECTORS WITH ACTIVE DETECTOR SURFACE FOR PARTIAL ENERGY DEPOSITION OF THE CHARGED PARTICLES AND RELATED METHODS

(75) Inventors: David W. Gerts, Idaho Falls, ID (US); Robert S. Bean, Rigby, ID (US); Richard R. Metcalf, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 308 days.

(21) Appl. No.: 12/907,834

(22) Filed: Oct. 19, 2010

(65) Prior Publication Data

US 2012/0091354 A1    Apr. 19, 2012

(51) Int. Cl.
*G01T 1/24*    (2006.01)
(52) U.S. Cl. .................. 250/370.01; 250/371
(58) Field of Classification Search ............ 250/361 R, 250/368, 370.01, 371
See application file for complete search history.

(56) References Cited

U.S. PATENT DOCUMENTS

| | | | |
|---|---|---|---|
| 6,645,787 | B2 | 11/2003 | Nemirovsky et al. |
| 2009/0294680 | A1 | 12/2009 | Nikolic et al. |

OTHER PUBLICATIONS

Chen et al., "Graphene Based Sensors for Detecting Special Nuclear Materials," Academic Research Initiative (ARI) Grantees Conference (Apr. 8, 2009).
Chen Y.P., "YIA: Interaction of Radiation with Graphene-based Nanomaterials for Sensing Fissile Materials," DTRA Technical Review (Oct. 21, 2009).
Chen Y.P., "Detection of Ionizing Radiations with Graphene Field Effect Transistors (GFET)" Nuclear Science Symposium, Medical Imaging Conference (Oct. 25-31, 2009).
Childres et al., "Effect of Energetic Electron Irradiation on Graphene," International Conference on Applications of Nuclear Techniques, AIP Conference Proceedings, vol. 1194, pp. 140-144 (2009).
Foxe et al., "Detecting of Ionizing Radiation Using Graphene Field Effect Transistors," manuscript received and published on Purdue University's Website (Nov. 13, 2009).

*Primary Examiner* — Mark R Gaworecki
(74) *Attorney, Agent, or Firm* — TraskBritt

(57) ABSTRACT

A radiation detector is disclosed. The radiation detector comprises an active detector surface configured to generate charge carriers in response to charged particles associated with incident radiation. The active detector surface is further configured with a sufficient thickness for a partial energy deposition of the charged particles to occur and permit the charged particles to pass through the active detector surface. The radiation detector further comprises a plurality of voltage leads coupled to the active detector surface. The plurality of voltage leads is configured to couple to a voltage source to generate a voltage drop across the active detector surface and to separate the charge carriers into a plurality of electrons and holes for detection. The active detector surface may comprise one or more graphene layers. Timing data between active detector surfaces may be used to determine energy of the incident radiation. Other apparatuses and methods are disclosed herein.

28 Claims, 7 Drawing Sheets

CHARGED PARTICLE DETECTORS WITH ACTIVE DETECTOR SURFACE FOR PARTIAL ENERGY DEPOSITION OF THE CHARGED PARTICLES AND RELATED METHODS

GOVERNMENT RIGHTS

This invention was made with government support under Contract Number DE-AC07-05ID14517 awarded by the United States Department of Energy. The government has certain rights in the invention.

TECHNICAL FIELD

Embodiments of the present disclosure relate generally to radiation detection and, more specifically, to apparatuses and methods for detecting radiation employing a graphene layer as an active surface generating the charge carriers used in radiation detection.

BACKGROUND

Radiation detectors often require interactions that convert incident radiation (e.g., neutrons, gamma rays, alpha particles, beta particles) into a measurable charge for processing and analysis. At the core of many radiation detectors is a charged particle detector. Conventional radiation detectors employ a substrate in which the radiation energy to be measured is fully deposited.

For example, FIG. 1 illustrates a conventional radiation detector 100. The conventional radiation detector 100 includes a substrate 110 coupled with a voltage source ($V_{SOURCE}$) 120. The conventional radiation detector 100 is configured for full energy deposition of incident radiation 105 within the substrate 110. For example, if incident radiation 105 interacts with the substrate 110, the energy is deposited within the substrate 110, and the incident radiation 105 may cease to propagate through the substrate 110 as indicated by line 106.

In operation, the interaction of the incident radiation 105 with the substrate 110 causes charge carriers (i.e., electron-hole pairs) to be generated within the substrate 110. If an electromagnetic field is initiated by applying a voltage to the substrate 110, the charge carriers can be separated and counted. For example, electrons 108 and holes 109 may move, respectively toward the voltage leads 122, 124 of the voltage source 120. Full energy deposition of the incident radiation 105 may be significant for an accurate measurement, because the number of charge carriers created is proportional to the amount of energy in the incident radiation 105. Therefore, for the conventional radiation detector 100 to appropriately measure the total amount of energy exhibited by the incident radiation 105, the substrate 110 is configured for full energy deposition of the incident radiation 105.

FIG. 2 illustrates a radiation detector 200 according to another conventional approach to radiation detection. Radiation detector 200 includes a substrate 210 in contact with a graphene layer 211. The radiation detector 200 further includes a voltage source ($V_{SOURCE}$) 220. The voltage source 220 is coupled with the substrate 210 and the graphene layer 211 in order to generate a voltage drop thereacross.

In operation, incident radiation 205 interacts with the substrate 210 as the active surface to generate charge carriers within the substrate 210. The radiation detector 200 is configured for full energy deposition of incident radiation 205 within the substrate 210. For example, if incident radiation 205 interacts with the substrate 210, the energy is fully deposited within the substrate 210, and the incident radiation 205 may cease to propagate through the substrate 210 as indicated by line 206.

If a voltage is applied by voltage source 220, the charge carriers may move toward voltage leads 222, 224 of the voltage source 220. In particular, electrons 208 may move toward the positive (+) voltage lead 222 of the voltage source 220. As a result, the electrons 208 may reach the surface of the substrate 210 and interact with the graphene layer 211. The interaction of the electrons 208 with the graphene layer 211 may cause a modification of the resistance of the graphene layer 211. The change in resistance may be determined by measuring the voltage 230 across, and the current 240 through, the graphene layer 211. The change in resistance may be proportional to the number of charge carriers generated within the substrate 210 and that come in contact with the graphene layer 211. Therefore, while the number of charge carriers is not directly counted, an accurate measurement may still be dependent upon a full change in resistance in the graphene layer 211, such that full deposition of the incident radiation 205 within the substrate 210 may still be required.

Relying on charge carrier generation and collection to determine the presence and the characteristics of the incident radiation through conventional methods may result in reduced energy resolution that may be caused by statistical variations during charge carrier collection and counting. Such statistical variation of charge carrier collection may be caused by defects, thermal effects, and semiconductor impurities in the substrate 110, 210, among other reasons.

BRIEF SUMMARY

An embodiment of the present invention includes a radiation detector. The radiation detector comprises an active detector surface configured to generate charge carriers in response to charged particles associated with incident radiation. The active detector surface is further configured with a sufficient thickness for a partial energy deposition of the charged particles to occur and permit the charged particles to pass through the active detector surface. The radiation detector further comprises a plurality of voltage leads coupled to the active detector surface. The plurality of voltage leads are configured to couple to a voltage source to generate a voltage drop across the active detector surface and to separate the charge carriers into a plurality of electrons and holes for detection.

Another embodiment of the present invention includes a radiation detector. The radiation detector comprises a plurality of active detector surfaces. Each of the active detector surfaces of the plurality is separated from an adjacent active detector surface by a distance. Each of the active detector surfaces of the plurality of active detector surfaces is configured to generate charge carriers when interacting with a charged particle and to permit the charged particle to pass through to the next active detector surface of the plurality.

Yet another embodiment of the present invention includes methods for detecting radiation. The methods comprise generating charge carriers in an active detector surface in response to an interaction in the active detector surface with a charged particle associated with incident radiation, and in which the charged particle passes through the active detector surface with a partial energy deposition into the active detector surface. The methods further comprise separating the charge carriers into a plurality of electrons and holes, detecting at least one of the electrons and the holes, and determining at least one characteristic relating to the incident radiation based, at least in part, on detection of the at least one of the electrons and the holes.

DETAILED DESCRIPTION

Figure 1:
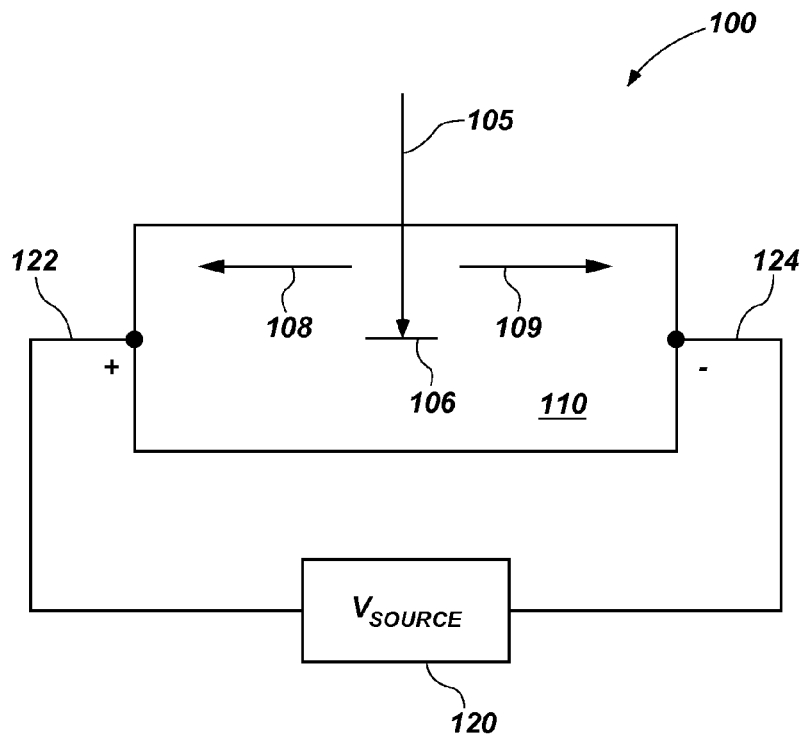
FIG. 1 illustrates a conventional radiation detector.
Figure 2:
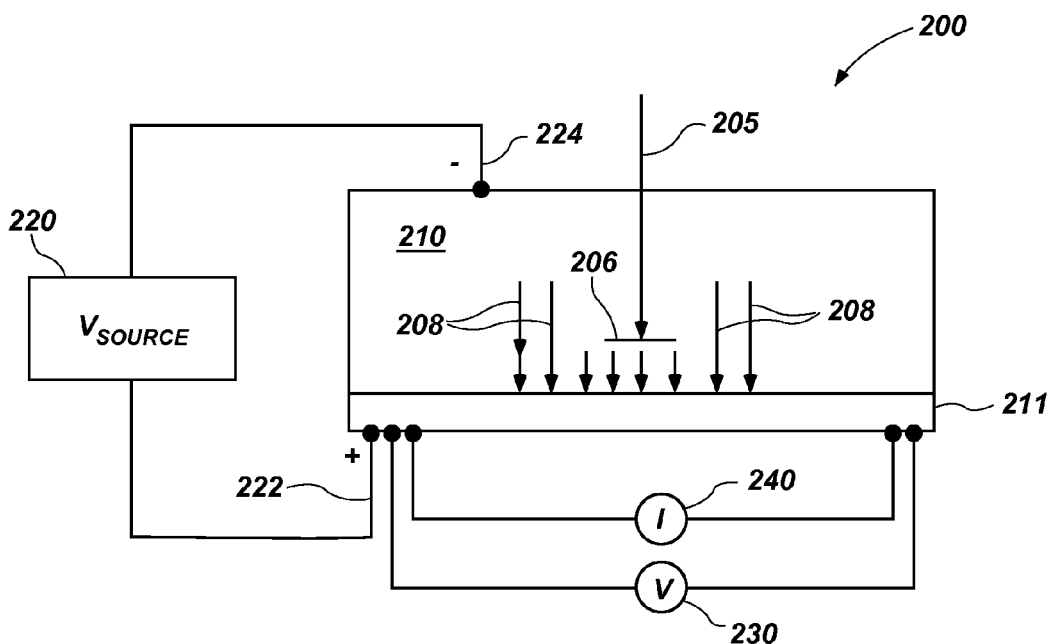
FIG. 2 illustrates a radiation detector according to another conventional approach to radiation detection.

In the following detailed description, reference is made to the accompanying drawings which form a part hereof and, in which are shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, specific implementations are shown and described only as examples and should not be construed as the only way to implement the present invention unless specified otherwise herein. It will be readily apparent to one of ordinary skill in the art that the various embodiments of the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Referring in general to the following description and accompanying drawings, various embodiments of the present invention are illustrated to show its structure and method of operation. Common elements of the illustrated embodiments may be designated with similar reference numerals. It should be understood that the figures presented are not meant to be illustrative of actual views of any particular portion of the actual structure or method, but are merely idealized representations employed to more clearly and fully depict the present invention defined by the claims below.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

It should be further appreciated and understood that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Graphene is a material known in the art, and generally this identifying term is used to describe a single-atom-thick planar sheet of carbon. Graphene exhibits the highest presently measured charge carrier mobility. For example, the charge carrier mobility of graphene may be approximately 250,000 $cm^2V^{-1}s^{-1}$ as compared to silicon at 1,500 $cm^2V^{-1}s^{-1}$, GaAs at 8,500 $cm^2V^{-1}s^{-1}$, or InSb at 70,000 $cm^2V^{-1}s^{-1}$. As a result, the current generated by the passage of a charged particle may be collected extremely quickly, such as in the sub-picosecond range. In addition, graphene may exhibit characteristics similar to those of semiconductors. For example, the random generation of electrons and holes (i.e., dark current) may be relatively small. As will be described herein, graphene may also be arranged in relatively thin strips called "nanoribbons" that can be located side-by-side to form a relatively larger sheet. Other configurations of sheets or configurations of materials that comprise graphene are also contemplated as a material for an active surface of a radiation detector, examples of which may be described herein.

The term "charge carriers" refer to free particles that carry an electric charge (e.g., positive charge, negative charge). In semiconductor physics, an example of a charge carrier is an electron, which exhibits a negative electric charge. In addition, it may be convenient to treat a "hole" (i.e., a traveling vacancy in the valence-band electron population) as a charge carrier. A hole exhibits a positive charge that may be equal in magnitude to that of an electron. Therefore, a "charge carrier" may refer to electrons, holes, or both electrons and holes.

Figure 3:
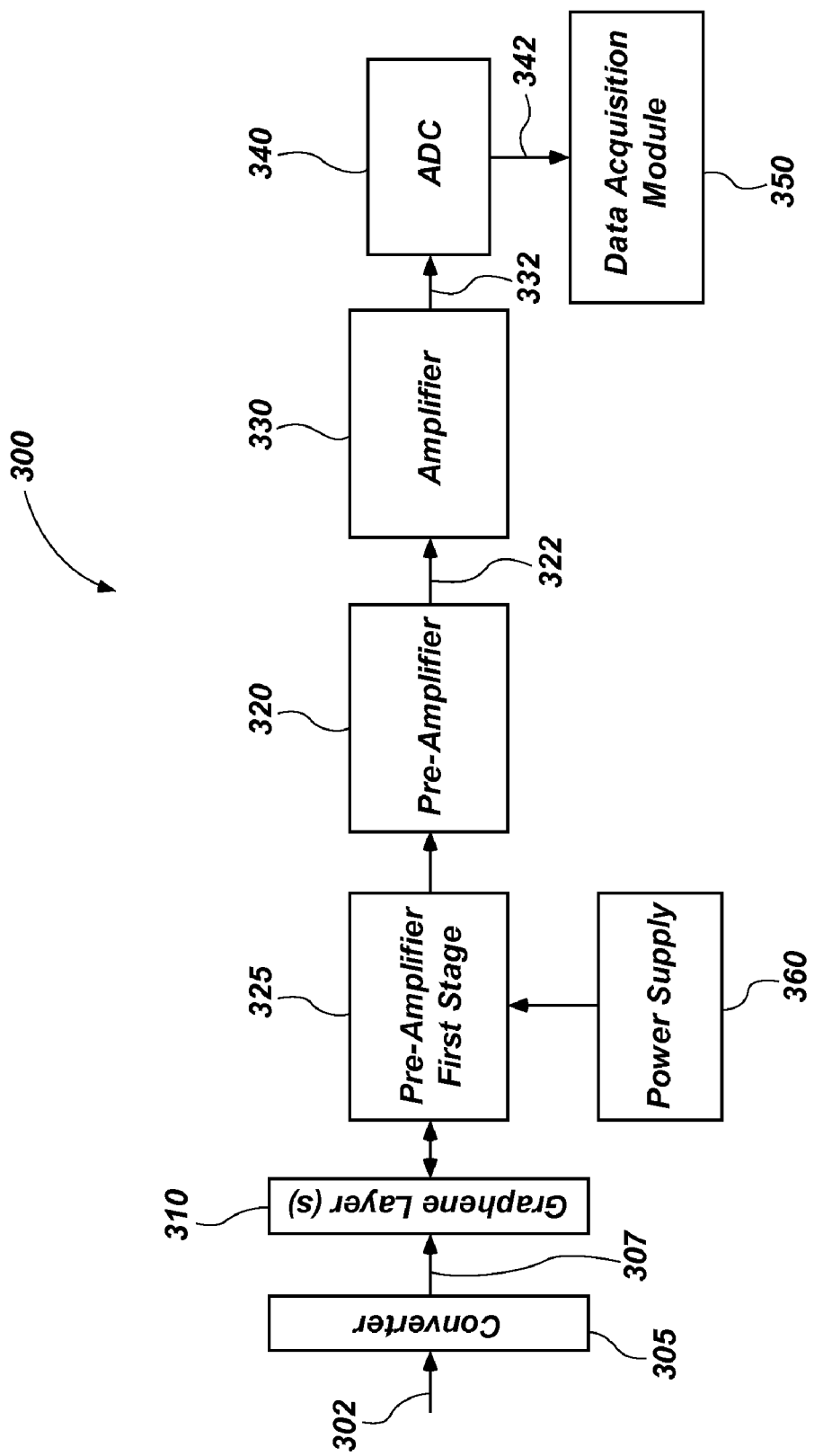
FIG. 3 is a simplified schematic block diagram of a radiation detection system according to an embodiment of the present invention.

FIG. 3 is a simplified schematic block diagram of a radiation detection system 300 according to an embodiment of the present invention. Radiation detection system 300 includes a converter 305, graphene layer 310, a pre-amplifier 320 that may include a first stage 325, an amplifier 330, an analog-to-digital converter (ADC) 340, and a data acquisition module 350, and a power supply 360.

The graphene layer 310 is configured as an active detector surface for detecting charged particles 307 that relate to incident radiation 302. In particular, the graphene layer 310 is configured to generate charge carriers (i.e., electron-hole pairs) in response to an interaction with the charged particles 307, which are associated with incident radiation 302. Examples of different configurations for the graphene layer 310 may include those configurations of the various embodiments illustrated and described herein. The graphene layer 310 may further be configured to have a sufficient thickness for partial energy deposition from the charged particles 307 to occur and permit the charged particles 307 to pass through the graphene layer 310. The graphene layer 310 may include one or more individual graphene layers.

The graphene layer 310 may only generate charge carriers in response to passing charged particles 307. The incident radiation 302 itself may include charged particles 307 (e.g., alpha particles and beta particles); however, some incident radiation 302 may not include charged particles 307 (e.g., neutrons and photons are neutral particles). The neutral particles, such as neutrons and photons (i.e., gamma rays), may not induce a desired response in the graphene layer 310. As a result, charged particles 307 may be converted from neutral particles in the incident radiation 302. The converter 305 may be located in front of the graphene layer 310 (i.e., in the path of incident radiation 302), which converter 305 may be configured to convert neutral particles into the charged particles 307 that interact with the graphene layer 310.

The inclusion or omission of the converter 305 can be used to selectively screen for a specific radiation type that is desired to be detected. For example, embodiments of detectors that do not include the converter 305 may be sensitive to incident radiation 302 that includes charged particles such as alpha particles, beta particles, or both. Embodiments of detectors that do include the converter 305 may be sensitive to incident radiation 302 that includes neutral particles such as neutrons, photons, or both. The converter 305 may also be configured and positioned to act as a shield and selectively distinguish between alpha and beta particles.

In one embodiment, the converter 305 may be configured to convert incident radiation 302 of a neutral type (e.g., neutron, photon) to a charged particle 307. For example, the converter 305 may include a hydrogenous material (e.g., plastic) in order to generate a desired signal from epithermal and high energy neutrons. As a result, the converter 305 may be configured to selectively screen for incident radiation 302 that includes neutrons. As another example, the converter 305 including a tungsten material may generate a desired signal from an incident photon flux. As a result, the converter 305 may be configured to selectively screen for incident radiation 302 that includes photons. In both of these examples, the incident radiation 302 includes neutral particles that are converted by the converter 305 into charged particles 307, which charged particles 307 interact with the graphene layer 310 in order to generate the charge carriers detected by the radiation detector system 300.

In another embodiment, the converter 305 may be configured to act as a shield for charged particles of a particular energy level. For example, the converter 305 may include a relatively thin material of a sufficient thickness that allows beta particles to pass through while shielding lower energy alpha particles. In such a situation, different types of incident radiation 302 (e.g., alpha and beta particles) may be selectively screened by the converter 305 even when the incident radiation 302 itself includes charged particles 307. In other words, the converter 305 is configured to have the charged particles (not specifically labeled prior to interaction with the converter 305) with a relatively lower energy be fully deposited in the converter 305 while the charged particles 307 with relatively higher energy pass through to the graphene layer 310. In such a situation, the converter 305 may not necessarily be acting to convert the incident radiation 302 into charged particles 307, but rather is acting as a shield in order to selectively screen for the desired radiation type. Therefore, it is noted that while the term "converter" is used, the function of the converter is not necessarily intended to be limited to only the configuration where incident radiation with neutral particles is converted to charged particles. Unless otherwise specifically stated herein, the term "converter" also includes configurations where incident radiation that already includes charged particles is shielded to permit higher energy charged particles to pass through the converter. Additionally, the terms "charged particle" and "incident radiation" may occasionally be interchangeably used herein regardless of whether the incident radiation includes charged particles or has been converted to charged particles.

The pre-amplifier 320 is coupled with the graphene layer 310. The pre-amplifier 320 may collect the charge carriers and generate a characteristic electronic signal 322 in response thereto. The first stage 325 of pre-amplifier 320 may be separated from the rest of the pre-amplifier 320 in order to be located sufficiently close to the graphene layer 310 to reduce noise and signal loss.

The amplifier 330 is coupled with the pre-amplifier 320. The amplifier 330 is configured to amplify and shape the characteristic electronic signal 322 generated by the pre-amplifier 320 into an analog signal 332 for further processing, analysis, storage, or any combination thereof.

The ADC 340 is coupled with the amplifier 330. The ADC 340 is configured to receive the analog signal 332 generated by the graphene layer 310, pre-amplifier 320, and amplifier 330, and convert the analog signal 332 to a digital signal 342 for further processing, analysis, storage, or combinations thereof. The converted digital signal 342 may retain timing and amplitude information of the analog signal 332.

The data acquisition module 350 is coupled with the ADC 340. The data acquisition module 350 receives the digital signal 342 from the ADC 340, upon which the digital signal 342 may be processed, analyzed, and stored by the data acquisition module 350. For example, the data acquisition module 350 may determine information from the digital signal 342 including a time stamp, a total charge collected, a speed of the charge collected, a comparison of the relative collection times of the electrons and holes, a particle type, energy of the particle, direction of travel, and other related information.

The power supply 360 may be coupled to the various components of the radiation detector system 300 in order to provide sufficient operating power thereto. In particular, the power supply 360 may be coupled to the first stage 325 of the pre-amplifier 320 and the graphene layer 310 in order to provide a voltage potential to move the charge carriers within the graphene layer 310.

The graphene layer 310 may include a plurality of individual graphene layers. Each graphene layer of the plurality may be coupled with its own pre-amplifier, amplifier, ADC, or combinations thereof. In the various embodiments of the present invention, parallel signal processing lines may extend from the graphene layer 310 to the data acquisition module 350. Such parallel signal processing lines may be employed for data collection of charge carriers generated in the graphene layer 310.

Figure 4:
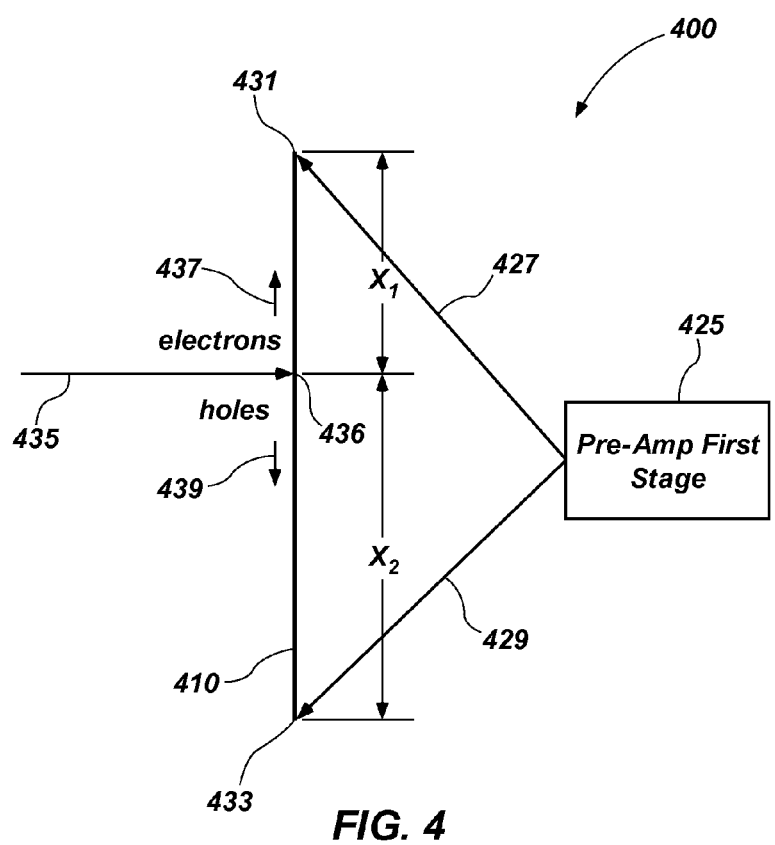
FIG. 4 is a schematic diagram of a portion of a radiation detection system including a side view of a graphene layer according to an embodiment of the present invention.

FIG. 4 is a schematic diagram of a portion of a radiation detection system 400 including a side view of a graphene layer 410 according to an embodiment of the present invention. The graphene layer 410 is employed as an active surface to detect charged particles 435 associated with incident radiation. As described in FIG. 3, a graphene layer 410 may be operably coupled with a pre-amplifier (not shown in FIG. 4, see FIG. 3), and in particular, a first stage 425 of a preamplifier. The first stage 425 of the preamplifier may couple with the graphene layer 410 with voltage leads 427, 429. Voltage leads 427, 429 may also be referred to, respectively, as an anode and a cathode. As an example, the voltage leads 427, 429 may couple with respective opposing edges 431, 433 of the graphene layer 410 in order to generate a voltage drop thereacross. In some configurations (e.g., FIG. 6), voltage leads 427, 429 may include a plurality of voltage lead pairs.

In operation, the charged particles 435 may interact with the graphene layer 410 at an interaction point 436. The charged particles 435 may be generated by incident radiation directly or through a converter 305 (FIG. 3) as previously discussed above in relation to FIG. 3. As a result of the interaction, one or more charge carriers (i.e., electron/hole pairs) are created at the interaction point 436 in the graphene layer 410. Because of the voltage drop across the graphene layer 410, electrons 437 move toward voltage lead 427 and holes 439 move toward voltage lead 429. The electrons 437 and holes 439 may be amplified and detected by the first stage 425 of the preamplifier as well as with other components of a radiation detector system as previously discussed above in relation to FIG. 3. Therefore, the graphene layer 410 may be employed successfully as an active surface to generate and detect charge carriers. Additionally, while conventional radiation detectors rely on full energy deposition of the charged particles 435 in order to count charge carriers accurately, or to effectively measure a change in resistance of a material responding to charge carrier interactions, the graphene layer 410 has a thickness that is sufficiently thin for a partial energy deposition of the charged particles 435 while permitting at least a portion of the energy deposition of the charged particles 435 to pass through the graphene layer 410.

The timing relationship between the collection of the electrons 437 and the holes 439 may be maintained by the radiation detection system 400. Such timing information may be used in further analysis of the characteristics incident radiation. For example, the timing information may be used to determine a position of the interaction point 436 of the incident radiation on the graphene layer 410. In particular, the distances x1, x2 between the interaction point 436 and the respective voltage leads 427, 429 may be determined based on a timing relationship between the reception of the electrons 437 and the holes 439 by the voltage leads 427, 429. Assuming that the distance between the voltage leads 427, 429 is known, the position of the interaction point 436 along an axis can be determined algebraically. For example, the position of the interaction point 436 along the graphene layer 410 may be determined by:

$$x1 = m*t1 \qquad (1); \text{ and}$$

$$x2 = m*t2 \qquad (2),$$

where "m" is the speed of the charge carrier, "x1" is the distance that the electrons move, "t1" is the time to collect the electron signal, "x2" is the distance that the holes move, and "t2" is the time to collect the hole signal. It is noted that, in graphene, the electrons 437 and the holes 439 each travel at approximately the same rate (approximately the speed of light), and that electrons 437 and holes 439 may not necessarily travel at approximately the same rate in other materials.

Figure 5:
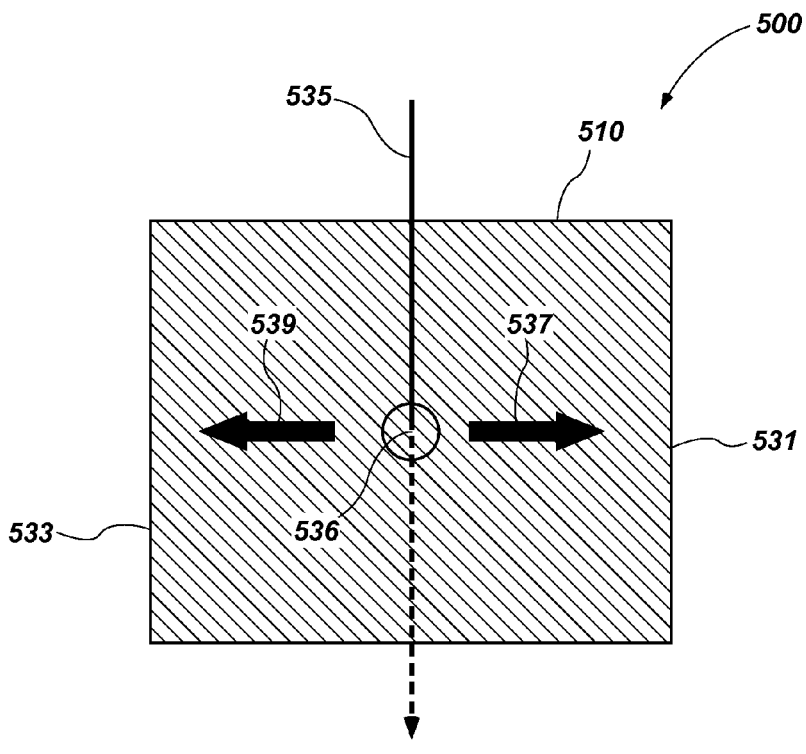
FIG. 5 is a front view of a graphene layer that may be used in a radiation detection system according to an embodiment of the present invention.

FIG. 5 is a front view of a graphene layer 510 that may be used in a radiation detection system 500 according to an embodiment of the present invention. The graphene layer 510 may be employed as an active surface to detect charged particles 535 that are part of the incident radiation, or that are generated by converting the incident radiation to charged particles 535. In particular, the radiation detection system 500 may further be configured as a counter for a specific type of radiation if a converter 305 (FIG. 3) is located in the path of the charged particles 535 prior to the graphene layer 510.

In operation, charged particles 535 may move along a path from one side of the graphene layer 510 and through to another side of the graphene layer 510. The path of the charged particles 535 may be orthogonal to the graphene layer 510. The path of the charged particles 535 may alternatively be angular with respect to the graphene layer 510. As will be illustrated below (FIG. 9), the path of the charged particles 535 may be parallel to the graphene layer 510.

If the charged particles 535 interact with the graphene layer 510 at interaction point 536, charge carriers may be generated in the graphene layer 510. The charge carriers include electrons (the movement of which is represented by arrow 537) and holes (the movement of which is represented by arrow 539). The radiation detection system 500 may include voltage leads (not shown in FIG. 5) that are coupled with the graphene layer 510 in order to generate a voltage drop thereacross. For example, voltage leads may be coupled with opposing ends 531, 533 of the graphene layer 510. With a voltage drop across the graphene layer 510, the electrons and holes may move toward the respective opposing ends 531, 533 of the graphene layer 510. The electrons and the holes can be detected by the voltage leads and other components of a detection system (FIG. 3). In some embodiments, the radiation detection system 500 may be configured to detect only one of the electrons and the holes. As opposed to conventional radiation detectors, full energy deposition of the charged particles 535 in the graphene layer 510 may not be required to obtain an accurate determination of the incident radiation from the collection of the electrons and holes.

Figure 6:
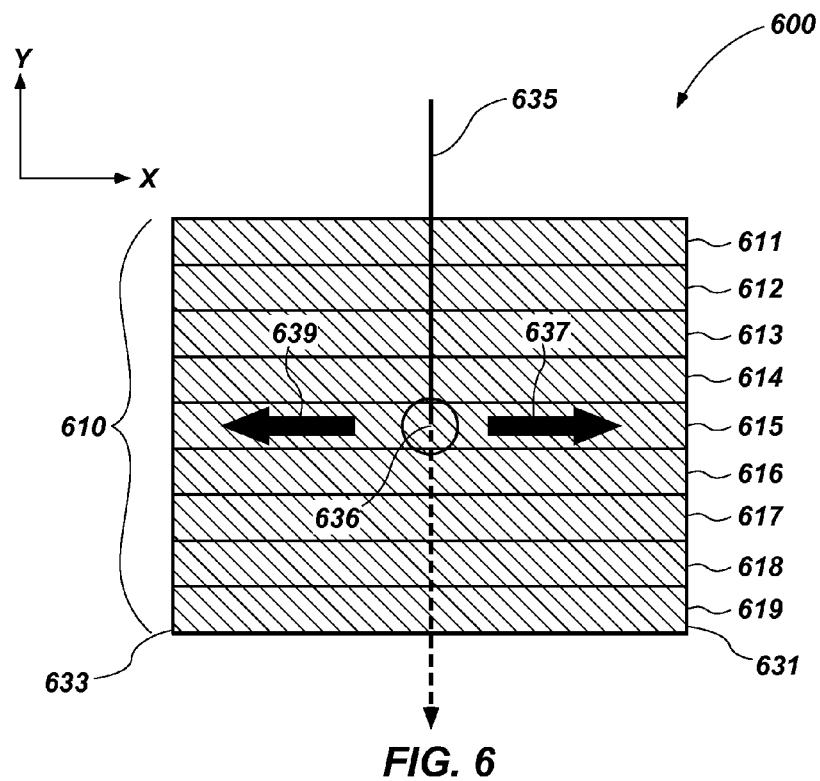
FIG. 6 is a front view of a graphene layer that may be used in a radiation detection system according to another embodiment of the present invention.

FIG. 6 is a front view of a graphene layer 610 that may be used in a radiation detection system 600 according to another embodiment of the present invention. The graphene layer 610 may include a plurality of graphene sub-layers 611-619 rather than a single sheet of graphene. For example, the plurality of graphene sub-layers 611-619 may be configured as graphene nanoribbons.

Each of the plurality of graphene sub-layers 611-619 may be coupled with separate voltage leads (not shown). For example, a first pair of voltage leads may be coupled with opposing ends of a first graphene sub-layer 611. A second pair of voltage leads may be coupled with opposing ends of a second graphene sub-layer 612, and so on.

In operation, charged particles 635 may move along a path from one side of the graphene layer 610 and through to another side of the graphene layer 610. If a charged particle 635 interacts with the graphene layer 610 at interaction point 636, charge carriers may be generated in the graphene layer 610. The charge carriers include electrons (the movement of which is illustrated by arrow 637) and holes (the movement of which is represented by arrow 639). The electrons and holes may move toward the opposing ends 631, 633 of the graphene layer 610 in the presence of an electric field as previously discussed.

The graphene sub-layers 611-619 may be used to further localize where a given interaction took place in two-dimensional space. For example, the location of the interaction point 636 in the y-direction may be determined according to which of the graphene sub-layers 611-619 is activated. For example, as shown in FIG. 6, the interaction point 636 may occur within graphene layers 614 and 615. As a result, charge carriers may be generated within graphene sub-layers 614 and 615. Because a plurality of graphene sub-layers (e.g., 614 and 615) may have charge carriers generated therein at a given time, a best position of the interaction point 635 in the y-axis may be determined, for example, by fitting a Gaussian distribution to the measured current and calculating the mean of the measured current. The location of the interaction point 636 in the x-direction may be determined at least in part by calculating the relative timing of collecting the electrons 637 and the holes 639 as previously described with reference to FIG. 4.

Figure 7:
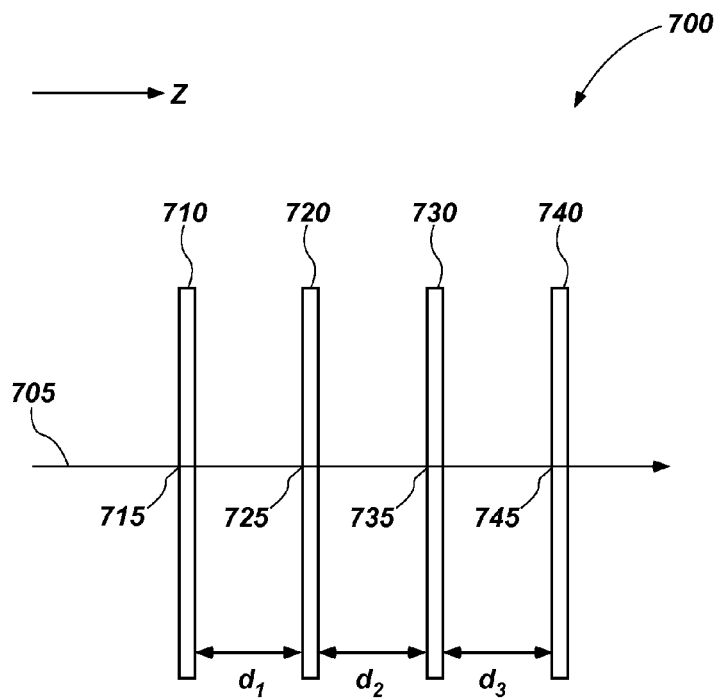
FIG. 7 illustrates a side view of a radiation detector that includes a plurality of graphene layers.

FIG. 7 illustrates a side view of a radiation detector 700 that includes a plurality of graphene layers 710, 720, 730, and 740. The radiation detector 700 with a plurality of graphene layers 710, 720, 730, 740 may be used to determine the energy of the charged particles 705 associated with incident radiation. The energy of charged particles 705 may be determined based on timing of the interactions between the plurality of graphene layers 710, 720, 730, 740, as there exists a relationship between the energy of the charged particles 705 and the velocity of the charged particles 705.

The plurality of graphene layers 710, 720, 730, 740 may be positioned parallel to each other, and separated by distances $d_1$, $d_2$, and $d_3$ in the z-direction shown. In other words, the first graphene layer 710 and the second graphene layer 720 are separated by distance $d_1$. The second graphene layer 720 and the third graphene layer 730 are separated by distance $d_2$. The third graphene layer 730 and the fourth graphene layer 740 are separated by distance $d_3$. In some embodiments, distances $d_1$, $d_2$, and $d_3$ may be approximately equal. For example, distances $d_1$, $d_2$, and $d_3$ may each be in the range of 1 millimeter; however, other distances are contemplated such as smaller distances of approximately 30 micrometers, with a timing resolution between graphene layers 710, 720, 730, 740 to be in a sub-picosecond range. Of course, it is contemplated that more or fewer graphene layers may be employed than the four graphene layers illustrated in FIG. 7. In addition, the energy resolution of the radiation detector 700 may depend on the number of graphene layers and the distance between the graphene layers.

In operation, the charged particles 705 interact with each of the plurality of graphene layers 710, 720, 730, 740. For example, the charged particles 705 interact with the first graphene layer 710 at interaction point 715. The charged particles 705 interact with the second graphene layer 720 at interaction point 725. The charged particles 705 interact with the third graphene layer 730 at interaction point 735. The charged particles 705 interact with the fourth graphene layer 740 at interaction point 745. At each graphene layer 710, 720, 730, 740 of the plurality, there may exist only a partial energy deposition for the charged particles 705. Such a partial energy deposition in a given graphene layer may permit the charged particles 705 to interact with the next graphene layer in the path in order to obtain the timing relationship between the plurality of graphene layers 710, 720, 730, 740.

For example, the velocity of the charged particles 705 may be approximately, $$v = \frac{Dx}{Dt}, \qquad (3)$$

where "Dx" is the known distance (e.g., $d_1$, $d_2$, and $d_3$) between graphene layers 710, 720, 730, 740, and "Dt" is the measured difference in timing the interactions between graphene layers 710, 720, 730, 740. As a result, an individual velocity (v) may be calculated for each graphene layer 710, 720, 730, 740 of the plurality. In other words, the individual velocity (v) for the charged particles 705 can be calculated as the charged particles 705 pass through each graphene layer 710, 720, 730, 740. An overall velocity for the charged particles 705 may be calculated from the individual velocities (v). For example, the overall velocity for the charged particles 705 may be calculated from an average of the individual velocities (v) calculated for each graphene layer 710, 720, 730, 740. In some embodiments, some of the individual velocities may be given more or less weight in determining the overall velocity of the charged particles 705.

With an estimated overall velocity of the charged particles 705, the energy of the charge particles 705 may be estimated. For example, the energy of the charge particles 705 may be approximately, $$KE = \frac{m_e c^2}{\sqrt{1 - v/c^2}} - m_e c^2, \qquad (4)$$

where "KE" is the kinetic energy of the charged particles 705, "$m_e$" is the mass of the charged particles 705, "c" is the speed of light, and "v" is the velocity of the charged particles 705. The velocity (v) in equation 4 may be the overall velocity calculated from the individual velocities in equation 3. It is noted that the subscript "e" (as used in equation (4)) implies the particle is specifically an electron. Therefore, equation (4) may be specifically used for determination of the kinetic energy of an electron. In order to determine kinetic energy for a charged particle other than an electron, the mass of the charged particle may be used in equation (4) in place of the mass of the electron. In another embodiment, the velocity may be calculated by tracking a path of travel of the charged particles 705 through the different graphene layers 710, 720, 730, 740 in the presence of an applied magnetic field. The timing information related to the time differences between the different interactions may not be required in the calculation of the velocity (v) according to this other embodiment.

Given an externally applied magnetic field, the charged particle 705 will curve in the magnetic field according to a radius. The radius may be estimated by, $$\text{radius} = \frac{m_e v}{q_e B}, \quad (5)$$

where, "$m_e$" is the mass of the charged particles 705, "v" is the velocity of the charged particles 705, "$q_e$" is the charge of the charged particles 705, and "B" is the value of the externally applied magnetic field. It is noted that the subscript "e" (as used in equation (5)) implies the particle is specifically an electron. Therefore, equation (5) may be specifically used for determination of the radius of an electron in the presence of the externally applied magnetic field. In order to determine radius for a charged particle other than an electron, the mass of the charged particle and the charge of the charged particle may be used in equation (5) in place of the mass and charge of the electron.

The radius may be determined geometrically by determining the x/y coordinates for each of the interaction points 715, 725, 735, 745 in the different graphene layers 710, 720, 730, 740 of the plurality. For example, the x/y coordinates for a given graphene layer may be determined similar to the manner described in relation to FIG. 6. In other words, the different graphene layers 710, 720, 730, 740 of the plurality may include graphene nanoribbons to assist in resolving the location of the interaction point in one of the directions, and the relative timing between the collection of the electrons and the holes for the other direction.

As an example, it is assumed that three x/y coordinates are [(x1, y1), (x2, y2), (x3, y3)] determined. The first point (x1, y1) may be the x/y coordinate of the first interaction point 715 for the first graphene layer 710. The second point (x2, y2) may be the x/y coordinate of the second interaction point 725 for the second graphene layer 720. The point (x3, y3) may be the x/y coordinate of the third interaction point 735 for the third graphene layer 730. The radius may be calculated geometrically as, $$\text{radius} = \frac{\sqrt{((x1-x2)^2 + (y1-y2)^2)((x1-x3)^2 + (y1-y3)^2)((x2-x3)^2 2 + (y2-y3)^2)}}{2\sqrt{(x2y1 - x3y1 - x1y2 + x3y2 + x1y3 - x2y3)^2}} \quad (6)$$

It is noted that a fourth interaction point 745 for the fourth graphene layer 740 is shown in FIG. 7. However, the x/y coordinate for the fourth interaction point 745 was omitted to reduce the complexity of equation 6. Those skilled in the art will recognize that more or fewer graphene layers may be used to geometrically calculate the radius of the path of the charged particles 705 in the presence of an externally applied magnetic field. More graphene layers may increase the resolution and accuracy of the radius calculated.

With knowledge of the radius calculated in equation 6, the velocity (v) of the charged particles 705 may be calculated in equation 5 by solving for velocity (v). With the velocity (v), the energy (KE) of the charged particles 705 may be determined as previously described with equation 4.

Figure 8:
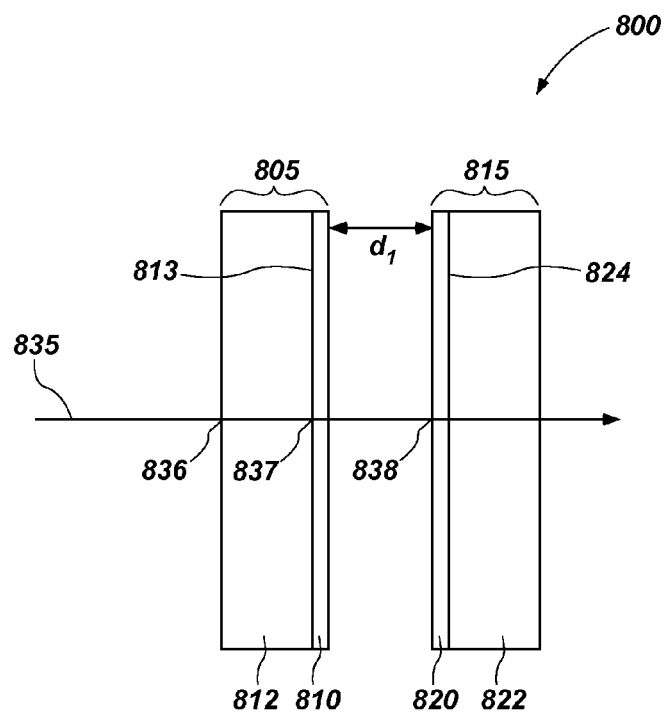
FIG. 8 is a side view of a radiation detector that includes a plurality of radiation detectors.

FIG. 8 is a side view of a radiation detector 800 that includes a plurality of radiation detectors 805, 815. The plurality of radiation detectors 805, 815 may include a first radiation detector 805 and a second radiation detector 815. The first radiation detector 805 includes a first graphene layer 810 associated (e.g., coupled) with a first substrate 812. Second radiation detector 815 includes a second graphene layer 820 associated (e.g., coupled) with a second substrate 822. For example, the graphene layers 810, 820 may be deposited on the substrates 812, 822 according to methods known in the art. An example of a material that may be used for substrates 812, 822 includes $SiO_2$. The first radiation detector 805 is separated from the second radiation detector 815 by a distance $d_1$. While two detectors are shown in FIG. 8, a single detector including a graphene layer and a substrate is contemplated in which the graphene layer is employed as the active surface generating the charge carriers. Likewise, more than two detectors that include a graphene layer and a substrate may be employed.

The first and second substrates 812, 822 may be used to provide structural support for the respective first and second graphene layers 810, 820. The first substrate 812 may also be located in the path of incident radiation 835 prior to the first graphene layer 810 such that the first substrate 812 is configured as a converter as is described herein. As a result, the material for the first substrate 812 may be chosen such that the first substrate 812 is configured as a converter to selectively screen for a particular radiation type. Therefore, the first substrate 812 may be formed from tungsten, plastics, or other appropriate materials in order to selectively screen for alpha particles, beta particles, and gamma rays as previously described. Of course, the second substrate 822 and other subsequent substrate layers (not shown) may be formed from such other materials.

Orientation of the second radiation detector 815 may be flipped (i.e., inverted) relative to the first radiation detector 805 in that the second graphene layer 820 and the first graphene layer 810 are facing each other without either of the second substrate 822 or the first substrate 812 therebetween. In other words, the first graphene layer 810 may be coupled with a back side 813 of the first substrate 812, and the second graphene layer 820 may be coupled with a front side 824 of the second substrate 822. The first graphene layer 810 and the second graphene layer 820 are separated by a known distance $d_1$.

In operation, incident radiation 835 interacts with the first substrate 812 at interaction point 836, which interaction may generate charged particles in the situation where the first substrate 812 is configured as a converter. In the situation where the incident radiation 835 includes charged particles, the first substrate 812 may be present more for structural reasons rather than having the additional benefit of being configured as a converter. The incident radiation 835 may interact with the first graphene layer 810 at interaction point 837 as the incident radiation 835 travels out of the back side 813 of the first substrate 812. As a result, the charge carriers may be generated and collected in the first graphene layer 810 as previously described herein. The first radiation detector 805 may be configured such that the energy of the incident radiation 835 is not fully deposited therein, such that the incident radiation 835 continues to interact with the second radiation detector 815. As a result, the incident radiation 835 may interact with the second graphene layer 810 at a second interaction point 838 as the incident radiation 835 exits the first radiation detector 805. Charge carriers may be generated and collected in the second graphene layer 820 as previously described herein. The energy of the incident radiation 835 may be based at least in part on the timing differences between the collection of charge carriers in the first graphene layer 810 and the second graphene layer 820, or by determining a path of the charged particles 835 in the presence of an externally applied magnetic field as previously described herein in relation to FIG. 8.

It is noted that, while conventional configurations may include a graphene layer coupled with a substrate, such conventional configurations are configured for full energy deposition of the charged particle in the substrate in order to rely on the substrate itself being the active surface for charge carrier generation to alter the resistive properties of the graphene. However, embodiments of the present invention employ the graphene layer itself as the active surface to generate and detect charge carriers and determine characteristics of the incident radiation. Some of the characteristics of the incident radiation may be determined through interactions within successive graphene layers. Therefore, the first substrate 812 may be of a thickness less than that required for full energy deposition of the charged particle. In embodiments that employ a plurality of radiation detectors, the substrates 812, 822 may have thicknesses that permit partial energy deposition of the charged particle in order for the charged particles to allow generation of charge carriers to occur in the successive graphene layers.

Figure 9:
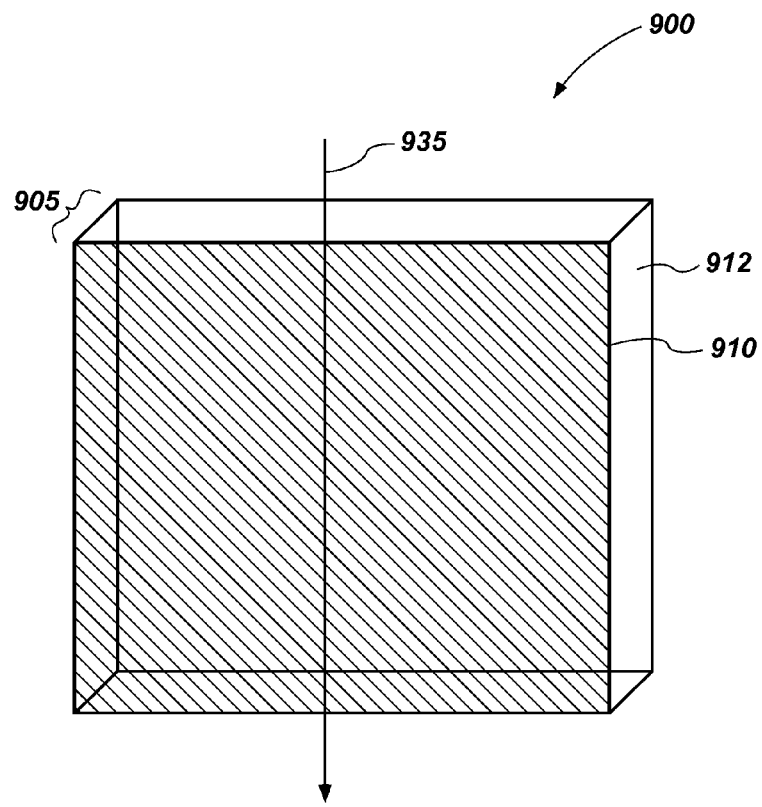
FIG. 9 is a frontal-perspective view of a radiation detector that may be used in a radiation detection system according to another embodiment of the present invention.

FIG. 9 is a frontal-perspective view of a radiation detector 905 that may be used in a radiation detection system 900 according to another embodiment of the present invention. Radiation detector 905 includes a graphene layer 910 coupled with a substrate 912. The graphene layer 910 and the substrate 912 may be configured as previously described herein with respect to FIG. 8.

FIG. 9 indicates that the charged particles 935 may generate charge carriers without passing through the graphene layer 910 if the charged particles 935 are sufficiently proximate with the graphene layer 910 to cause ionization in the graphene layer 910. In other words, the charged particles 935 may travel across the surface (e.g., parallel) of the graphene layer 910 and interact with the graphene layer 910 to generate charge carriers therein. Although FIG. 9 illustrates an embodiment where the radiation detector 905 includes a substrate 912, embodiments that do not include the substrate 912 may likewise have interactions (i.e., ionization) between charged particles 935 and the graphene layer 910 without the charged particles 935 travelling through the graphene layer 910. Therefore, even though a definition of the term "incident" radiation might imply that the radiation must strike something, the term should not be interpreted to require physical contact unless specifically described as such. In light of the description related to FIG. 9, incident radiation should be interpreted as being closely associated with the term "incoming" radiation.

Figures 10, 11:
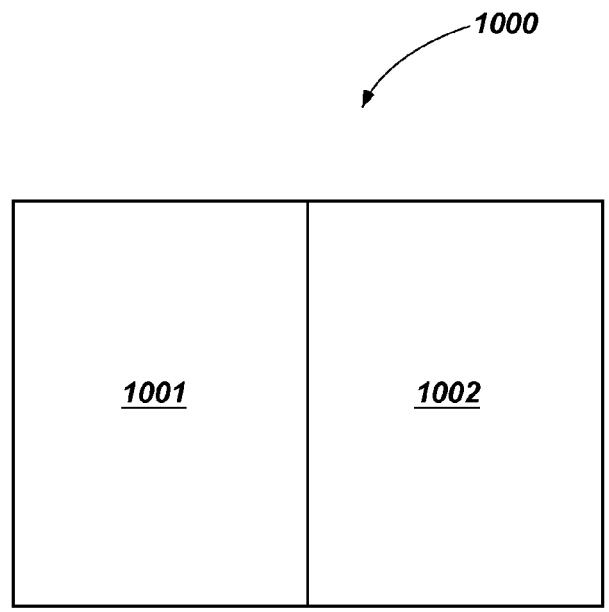
FIG. 10 is a schematic of a converter according to an embodiment of the present invention.
FIG. 11 is a schematic of a converter according to another embodiment of the present invention.

FIG. 10 is a schematic of a converter 1000 according to an embodiment of the present invention. As previously described, the converter 1000 may be located in the path of incident radiation and configured to selectively screen for a particular radiation type (e.g., alpha particles, beta particles, neutrons, gamma rays). The converter 1000 may align with one or more radiation detectors that include graphene layers. Such radiation detectors with graphene layers are not shown in FIG. 10, but examples of such are shown in other figures shown herein. For example, the graphene layer may be configured as a single sheet as shown in FIG. 5. Another example may include a graphene layer with a plurality of graphene sub-layers as shown in FIG. 6.

While a converter may be formed from a single, uniform material, a radiation detector system may be configured to selectively screen for a plurality of radiation type. For example, the converter 1000 may include more than a first material 1001 and a second material 1002 in order to selectively screen for more than one radiation type. For example, the first material 1001 may be configured to selectively screen for gamma rays, and the second material 1002 may be configured to selectively screen for neutrons.

To align with graphene layers to form a radiation detector, a first graphene sub-layer may at least substantially align with the first material 1001, and a second graphene sub-layer may at least substantially align with the second material 1002. Other embodiments may include separate radiation detectors aligning with each material 1001, 1002.

FIG. 11 is a schematic of a converter 1100 according to another embodiment of the present invention. As with FIG. 10, FIG. 11 illustrates that a converter 1100 may include more than one material 1101, 1102 in order to selectively screen for a plurality of different radiation types. FIG. 11 additionally illustrates that a variety of configurations of materials 1101, 1102 are contemplated as embodiments of the present invention. For example, converter 1100 is configured in a checkerboard configuration in which a first material 1101 and a second material 1102 alternate along adjacent rows and columns. Other configurations and patterns for the converter 1100 are also contemplated, including those that include more than two materials.

The converter 1100 may align with one or more radiation detectors that include graphene layers. Such radiation detectors with graphene layers are not shown in FIG. 11, but examples of such may include those embodiments described herein. For example, the graphene layer may be configured as a single sheet as shown in FIG. 3. Another example may include a graphene layer with a plurality of graphene sub-layers as shown in FIG. 4. For example, graphene sub-layers may be arranged in a pattern similar to the first material 1101 and the second material 1102.

Another example includes graphene sub-layers that at least substantially align with a full row ($R_1$-$R_4$) or a full column ($C_1$-$C_5$) of the converter 1100. For example, a first graphene sub-array may at least substantially align with column $C_1$. A second graphene sub-layer may at least substantially align with column $C_2$, and so on. Alternatively, graphene sub-layers may similarly align with rows $R_1$-$R_4$.

Another example includes a first graphene sub-layer that at least substantially aligns with an adjacent pair of a first material 1101 and a second material 1102. In other words, a first graphene sub-layer may at least substantially align with the first material 1101 and the second material 1102 of rows $R_1$ and $R_2$ of column $C_1$. A second graphene sub-layer may at least substantially align with the first material 1101 and the second material 1102 of rows $R_3$ and $R_4$ of column $C_1$. Other graphene sub-layers may at least substantially align with partial rows and columns of the converter 1100. Other embodiments may include separate radiation detectors aligning with different combinations of each material 1101, 1102.

Figure 12:
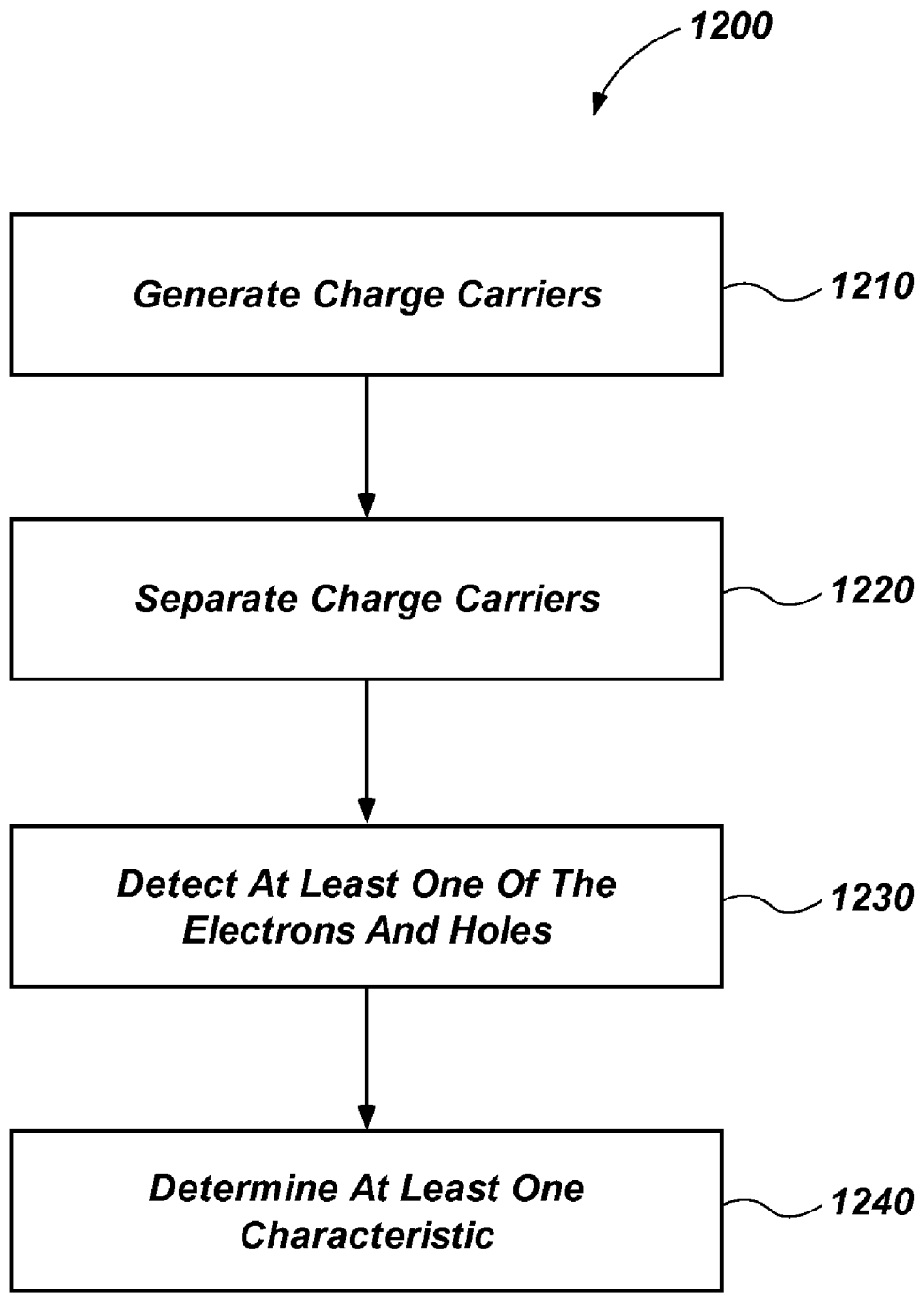
FIG. 12 is a flowchart of a method for detecting radiation according to an embodiment of the present invention.

FIG. 12 is a flowchart 1200 of a method for detecting radiation according to an embodiment of the present invention. At operation 1210, charge carriers may be generated in an active detector surface in response to an interaction in the active detector surface with a charged particle associated with incident radiation. The charged particle may further pass through the active detector surface with a partial energy deposition into the active detector surface. The active detector surface may be one or more graphene layers. At operation 1220, the charge carriers may be separated into electrons and holes. The separation of electrons and holes may be accomplished by generating an electric field, such as a voltage drop across the active detector surface. At operation 1230, at least one of the electrons and the holes may be detected. In some embodiments, both electrons and holes may be detected at the active detector surface. At operation 1240, at least one characteristic about the incident radiation may be determined that is based at least in part on detection of the at least one of the electrons and the holes. The at least one characteristic about the incident radiation may include radiation type, energy of the radiation, path of the incident radiation, timing characteristics of the collection of the charge carriers, among other characteristics.

As an example, the incident radiation may be selectively screened for the active detector surface to be sensitive to a desired radiation type, and the at least one characteristic about the incident radiation may include a radiation type for the incident radiation.

As another example, charge carriers may be generated and detected in at least one additional active detector surface after the charged particle has passed through the active detector surface, and determining the at least one characteristic may includes determining an energy level associated with the charged particle. The energy level associated with the charged particle may be based at least in part on an estimate of a velocity of movement for the charged particle between the active detector surface and the at least one additional active detector surface.

Determining the energy level associated with the charged particle may include generating a magnetic field around the active detector surface and the at least one additional active detector surface, and estimating the velocity of movement for the charged particle by determining a radius of a path that the charged particle moves when influenced by the magnetic field. Determining the radius of the path that the charged particle moves may include calculating a first x/y coordinate for an interaction point of the charged particle in the active detector surface, and calculating a second x/y coordinate for an interaction point of the charged particle in the at least one additional active detector surface. As another example, determining the energy level associated with the charged particle may include calculating a timing difference between interactions of the charged particle with the active detector surface and the at least one additional active detector surface.

While the different apparatuses and methods are described throughout this description as employing a graphene layer as an active detector surface for radiation detection, other materials may also be employed that are still within the scope of the invention, including materials that may not have as desirable of a charge carrier mobility as does graphene. Therefore, the techniques and embodiments described herein should not be viewed to be limited to graphene, and the claims should not be interpreted to require such, without a specific recitation of such in the claims. In particular, while the invention is susceptible to various modifications and implementation in alternative forms, specific embodiments have been shown by way of non-limiting example in the drawings and have been described in detail herein. It should be understood that the invention is not intended to be limited to the particular forms disclosed. Rather, the invention includes all modifications, equivalents, and alternatives falling within the scope of the following appended claims and their legal equivalents.

What is claimed is:

1. A radiation detector, comprising:
   an active detector surface configured to generate charge carriers in response to charged particles associated with incident radiation, wherein the active detector surface is further configured with a sufficient thickness for a partial energy deposition of the charged particles to occur and permit the charged particles to pass through the active detector surface; and
   a plurality of voltage leads coupled to the active detector surface, the plurality of voltage leads configured to couple to a voltage source to generate a voltage drop across the active detector surface to separate the charge carriers into a plurality of electrons and holes for detection.

2. The radiation detector of claim 1, wherein the active detector surface comprises a graphene layer.

3. The radiation detector of claim 2, wherein the graphene layer comprises a plurality of graphene nanoribbons.

4. The radiation detector of claim 3, wherein each of the plurality of graphene nanoribbons is coupled with a different pair of voltage leads among the plurality of voltage leads.

5. The radiation detector of claim 2, wherein the active detector surface further comprises a substrate coupled with the graphene layer.

6. The radiation detector of claim 1, further comprising a converter located in a path of the incident radiation prior to the incident radiation's interaction with the active detector surface, wherein the converter is configured to selectively screen the incident radiation such that active detector surface is sensitive to at least one desired radiation type.

7. The radiation detector of claim 6, wherein the converter is configured to convert neutral radiation into charged particles.

8. The radiation detector of claim 6, wherein the converter is configured with a thickness sufficient to shield alpha particles from the active detector surface while allowing beta particles to pass through to the active detector surface.

9. The radiation detector of claim 6, wherein the converter comprises a patterned converter face including at least two different materials.

10. The radiation detector of claim 1, further comprising at least one additional active detector surface separated from the active detector surface by a distance.

11. The radiation detector of claim 10, further comprising a data analysis module configured to estimate an energy of the incident radiation based at least in part on a determination of a velocity of the charged particles.

12. The radiation detector of claim 11, wherein the determination of the velocity of charged particles is based at least in part on timing differences between collection of the charge carriers at the active detector surface and collection of the charge carriers at the at least one additional active detector surface.

13. The radiation detector of claim 11, wherein the determination of the velocity of charged particles is based at least in part on determination of a path of the charged particles between the active detector surface and the at least one additional active detector surface in a presence of an externally applied magnetic field.

14. A radiation detector, comprising a plurality of active detector surfaces, wherein each of the active detector surfaces of the plurality is separated from an adjacent active detector surface by a distance, and wherein each of the active detector surfaces of the plurality is configured to generate charge carriers when interacting with a charged particle and to permit the charged particle to pass through to another, adjacent active detector surface of the plurality.

15. The radiation detector of claim 14, wherein each of the plurality of active detector surfaces each comprises a graphene layer.

16. The radiation detector of claim 15, wherein the graphene layer comprises a plurality of nanoribbons.

17. The radiation detector of claim 14, further comprising a data acquisition module configured to analyze data received from detection of the charge carriers in each of the plurality of active detector surfaces.

18. The radiation detector of claim 17, wherein the data acquisition module is configured to estimate energy of the charged particle based, at least in part, on measuring a difference in timing a collection of the charge carriers in each of the active detector surfaces of the plurality.

19. The radiation detector of claim 17, wherein the data acquisition module is configured to estimate energy of the charged particle based, at least in part, on estimating a path of the charged particle through in each of the active detector surfaces of the plurality in the presence of an externally applied magnetic field.

20. The radiation detector of claim 14, further comprising a converter located in a path of the incident radiation prior to the plurality of active detector surfaces, wherein the converter is configured to selectively screen the incident radiation such that at least one among the plurality of active detector surfaces is sensitive to a desired radiation type.

21. A method for detecting radiation, the method comprising:
generating charge carriers in an active detector surface in response to an interaction in the active detector surface with a charged particle associated with incident radiation, and in which the charged particle passes through the active detector surface with a partial energy deposition into the active detector surface;
separating the charge carriers into a plurality of electrons and holes;
detecting at least one of the electrons and the holes; and
determining at least one characteristic about the incident radiation based at least in part on detection of the at least one of the electrons and the holes.

22. The method of claim 21, further comprising selectively screening the incident radiation for the active detector surface to be sensitive to at least one desired radiation type, wherein the at least one characteristic about the incident radiation includes at least one radiation type for the incident radiation.

23. The method of claim 21, wherein detecting at least one of the electrons and holes includes detecting both the electrons and the holes.

24. The method of claim 21, further comprising generating and detecting charge carriers in at least one additional active detector surface after the charged particle has passed through the active detector surface, and wherein the determining the at least one characteristic includes determining an energy level associated with the charged particle.

25. The method of claim 24, wherein determining an energy level associated with the charged particle is based, at least in part, on an estimate of a velocity of movement for the charged particle.

26. The method of claim 25, wherein determining the energy level associated with the charged particle includes:
generating a magnetic field around the active detector surface and the at least one additional active detector surface; and
estimating the velocity of movement for the charged particle by determining a radius of a path along which the charged particle moves when influenced by the magnetic field.

27. The method of claim 26, wherein determining the radius of the path along which the charged particle moves includes:
calculating a first x/y coordinate for an interaction point of generation of the charged particle in the active detector surface; and
calculating a second x/y coordinate for an interaction point of generation of the charged particle in the at least one additional active detector surface.

28. The method of claim 25, wherein determining the energy level associated with the charged particle includes calculating a timing difference between interactions of the charged particle with the active detector surface and with the at least one additional active detector surface.

* * * * *